(12) United States Patent
Peng et al.

(10) Patent No.: US 12,270,986 B1
(45) Date of Patent: Apr. 8, 2025

(54) EYEPIECE OPTICAL SYSTEM AND HEAD-MOUNTED DISPLAY DEVICE

(71) Applicant: Shenzhen NED Optics Co., Ltd, Shenzhen (CN)

(72) Inventors: Huajun Peng, Shenzhen (CN); Hongpeng Cao, Shenzhen (CN); Jianfei Guo, Shenzhen (CN)

(73) Assignee: Shenzhen NED Optics Co., Ltd, Shenzhen (CN)

(*) Notice: Subject to any disclaimer, the term of this patent is extended or adjusted under 35 U.S.C. 154(b) by 0 days.

(21) Appl. No.: 18/972,511

(22) Filed: Dec. 6, 2024

Related U.S. Application Data

(63) Continuation of application No. PCT/CN2022/098056, filed on Jun. 10, 2022.

(51) Int. Cl.
*G02B 25/00* (2006.01)
*G06F 1/16* (2006.01)

(52) U.S. Cl.
CPC ............ *G02B 25/001* (2013.01); *G06F 1/163* (2013.01)

(58) Field of Classification Search
CPC .............................. G02B 25/001; G06F 1/163

USPC ......................................................... 359/643
See application file for complete search history.

(56) References Cited

FOREIGN PATENT DOCUMENTS

| CN | 110426838 A | | 11/2019 |
|----|-------------|---|---------|
| CN | 112630978 A | | 4/2021 |
| JP | 2003241080 A | * | 8/2003 |
| JP | 2014074814 A | | 4/2014 |

* cited by examiner

*Primary Examiner* — William Choi
(74) *Attorney, Agent, or Firm* — Nitin Kaushik

(57) ABSTRACT

The present invention relates to an eyepiece optical system and a head-mounted display device. The system includes a first lens group, a second lens group, a third lens group, and a fourth lens group arranged coaxially and sequentially in an optical axis direction from an observation side of human eyes to a micro-image display side, wherein the first lens group has a positive effective focal length and is composed of a first lens close to a human eye side and a second lens away from the human eye side, the second lens group has a negative effective focal length and is composed of a third lens and a fourth lens, the third lens group has a positive effective focal length and is composed of a fifth lens, and the fourth lens group is composed of a sixth lens and a seventh lens. The system is suitable for head-mounted displays.

13 Claims, 16 Drawing Sheets

EYEPIECE OPTICAL SYSTEM AND HEAD-MOUNTED DISPLAY DEVICE

CROSS-REFERENCE TO RELATED APPLICATIONS

The application is a U.S. National Application of PCT Application Serial NO. PCT/CN2022/098056, filed Jun. 10, 2022, the entire contents of which are incorporated herein by reference.

TECHNICAL FIELD

The present invention relates to the field of optical technologies, and more specifically, to an eyepiece optical system and a head-mounted display device.

BACKGROUND

A head-mounted display device uses the optical technologies to guide video image light emitted by a micro-image display (such as a transmissive or reflective liquid crystal display screen, an organic electroluminescent device, and a DMD device) to pupils of a user, thereby achieving virtual and enlarged images within a range close to the eyes, and providing the user with intuitive and visual images, videos, and text information. It is applicable in outdoor, simulated driving, training, demonstration, teaching, training, medical, flight, and other scenarios.

With the continuous advancement of the optical technologies, requirements for high definition, low distortion, and other rigid performance indicators of an eyepiece optical system of a head-mounted display device are also constantly increasing. Under the existing basic processing capabilities, an eyepiece optical system needs to achieve indicators such as large field-of-view angle, high definition, and low distortion as much as possible, while meeting the above optical performance requirements is a great challenge for system design and aberration optimization.

There are common eyepiece optical systems each combined and constructed by a plurality of lenses, and many literatures propose their own designs based on this structure. Patent Literature 1 (Chinese Patent Publication No. CN109212740A) and Patent Literature 2 (Chinese Patent Publication No. CN210243956U) each adopt an optical system composed of five lenses and achieve good processability, but performance indicators of the above optical systems are poor.

Patent Literature 3 (Chinese Patent Publication No. CN112731666A) discloses an eyepiece optical system composed of six lenses, which achieves performance indicators such as large field-of-view angle, high image quality, and low distortion. However, the eyepiece optical system largely relies on a complex Fresnel optical face shape, and therefore, it is difficult to process.

Patent Literature 4 (Chinese Patent Publication No. CN101609208A) discloses an eyepiece optical system composed of six lenses, which achieves the effect of a large field-of-view angle, but its aberration correction is poor and its performance indicators are poor.

SUMMARY

A technical problem to be solved by the present invention is to provide an eyepiece optical system and a head-mounted display device in response to the above defects of the prior art.

To solve the technical problem, the present invention adopts the following technical solution:

An eyepiece optical system is constructed, including a first lens group, a second lens group, a third lens group, and a fourth lens group arranged coaxially and sequentially in an optical axis direction from an observation side of human eyes to a micro-image display side, wherein an effective focal length of the first lens group is $F_1$, and $F_1$ is a positive value, an effective focal length of the second lens group is $F_2$, and $F_2$ is a negative value, an effective focal length of the third lens group is $F_3$, and $F_3$ is a positive value, an effective focal length of the fourth lens group is $F_4$, and an effective focal length of the eyepiece optical system is F, and $F_1$, $F_2$, $F_3$, $F_4$, and F meet the following relational expressions (1), (2), (3), and (4):

$$0.92 \leq F_1/F \leq 1.20 \quad (1);$$

$$-0.84 \leq F_2/F \leq -0.49 \quad (2),$$

$$1.01 \leq F_3/F \leq 1.44 \quad (3);$$

$$0.90 \leq F_4/F \leq 2.88 \quad (4);$$

the first lens group is composed of two lenses, namely a first lens close to a human eye side and a second lens away from the human eye side, and both the first lens and the second lens are positive lenses; the second lens group is composed of two lenses, namely a third lens adjacent to the first lens group and a fourth lens away from the human eye side, and both the third lens and the fourth lens are negative lenses; the third lens group is composed of one lens, wherein the third lens group includes a fifth lens adjacent to the second lens group, and the fifth lens is a positive lens; and the fourth lens group is composed of two lenses, namely a sixth lens adjacent to the third lens group and a seventh lens away from the human eye side;

material properties of the various lenses in the eyepiece optical system meet the following relational expressions (5) and (6):

$$1.63 \leq Nd \leq 2.00 \quad (5);$$

$$20.4 \leq Vd \leq 54.90 \quad (6)$$

wherein Nd is a refractive index of each lens in the eyepiece optical system on a d-line, and Vd is an Abbe number of each lens in the eyepiece optical system on the d-line.

Further, the first lens is a plano-convex lens, an optical surface of the first lens close to the human eye side is a plane, and an optical surface of the first lens away from the human eye side is concave towards the human eyes.

Further, both the second lens and the fifth lens are biconvex lenses.

Further, the third lens is a biconcave lens, and both optical surfaces of the third lens are concave towards the human eye side.

Further, the fourth lens, the sixth lens, and the seventh lens are all meniscus lenses, and both optical surfaces of each of the fourth lens, the sixth lens, and the seventh lens are concave towards the micro-image display side.

Further, the effective focal length of the first lens group is $F_1$, the effective focal length of the second lens group is $F_2$, the effective focal length of the third lens group is $F_3$, the effective focal length of the fourth lens group is $F_4$, an effective focal length of the second lens is $f_2$, an effective focal length of the third lens is $f_3$, and an effective focal length of the seventh lens is $f_7$, and $F_1$, $F_2$, $F_3$, $F_4$, $f_2$, $f_3$, and $f_7$ meet the following relational expressions (7), (8), (9), and (10):

$$0.98 \leq F_3/F_1 \leq 1.46 \quad (7);$$

$$16.79 \leq f_2/F_1 \leq 23.83 \quad (8);$$

$$1.07 \leq f_3/F_2 \leq 1.20 \quad (9);$$

$$-3.51 \leq f_7/F_4 \leq 0.95 \quad (10).$$

Further, the curvature radii of the two optical surfaces of the sixth lens and the curvature radii of the two optical surfaces of the seventh lens meet the following relational expressions (11), (12), and (13):

$$-16.27 \leq R_{42}/R_{41} \leq 2.16 \quad (11);$$

$$0.15 \leq R_{43}/R_{41} \leq 0.36 \quad (12);$$

$$0.12 \leq R_{44}/R_{41} \leq 0.51 \quad (13);$$

wherein $R_{41}$ is a curvature radius of the surface of the sixth lens close to the human eye side, $R_{42}$ is a curvature radius of the surface of the sixth lens close to the micro-image display side, $R_{43}$ is a curvature radius of the surface of the seventh lens close to the human eye side, and $R_{44}$ is a curvature radius of the surface of the seventh lens close to the micro-image display side.

Further, the curvature radius of the optical surface of the third lens close to the human eye side is $R_{21}$, the curvature radius of the optical surface of the fourth lens close to an image source side is $R_{24}$, and $R_{21}$ and $R_{24}$ meet the following relational expression (14):

$$-0.15 \leq R_{21}/R_{24} \leq -0.02 \quad (14).$$

Further, each lens in the first lens group, the second lens group, the third lens group, and the fourth lens group is made of a plastic resin material or a glass material.

Further, the optical surface of the first lens away from the human eyes, and the optical surfaces of the second lens, the third lens, the fourth lens, the fifth lens, the sixth lens, and the seventh lens are all even-order aspherical surfaces, and the even-order aspherical surfaces meet the following relational expression (15):

$$z = \frac{cr^2}{1+\sqrt{1-(1+k)c^2r^2}} + \alpha_2 r^2 + \alpha_4 r^4 + \alpha_6 r^6 + \ldots ; \quad (15)$$

wherein z is a vector height of the optical surface, c is a curvature at an aspherical vertex, k is an aspherical coefficient, $\alpha_2$, $\alpha_4$, $\alpha_6$, ... are coefficients of various orders, and r is a distance coordinate from a point on a curved surface to an optical axis of the lens system.

The present invention further provides a head-mounted display device, including a micro-image display and an eyepiece, the eyepiece being located between human eyes and the micro-image display, wherein the eyepiece is the eyepiece optical system according to any one of the foregoing items.

Further, the micro-image display is an organic electroluminescent device or a transmissive liquid crystal display.

Further, the head-mounted display device includes two identical eyepiece optical systems arranged symmetrically.

The present invention has the following beneficial effects: The eyepiece optical system has advantages such as a compact structure, small size, large field of view, and high optical resolution. The eyepiece optical system adopts a first lens group, a second lens group, and a third lens group in a "positive, negative, positive" combination, in combination with a first lens, a second lens, a third lens, a fourth lens, a fifth lens, a sixth lens, and a seventh lens having low refractive indexes, which effectively alleviates the defects of the prior art, and has a better aberration correction ability and better processability, thereby achieving a large field-of-view angle, low distortion, and high optical resolution, reducing the manufacturing difficulty, manufacturing cost, and product weight of the eyepiece optical system, and greatly improving the optical performance of the system and the user experience of the product. Observers can view large-format images having full-frame high-definition, no distortion, and uniform image quality through the eyepiece optical system of the present invention, thereby achieving the visual experience with a high sense of presence.

BRIEF DESCRIPTION OF THE DRAWINGS

In order to more clearly illustrate the embodiments of the present invention or technical solutions in the prior art, the present invention will be further described hereafter with reference to accompanying drawings and embodiments. The accompanying drawings in the following description are only some embodiments of the present invention, and those of ordinary skill in the art can still derive other drawings from these accompanying drawings without creative efforts.

DETAILED DESCRIPTION OF THE EMBODIMENTS

Figure 1:
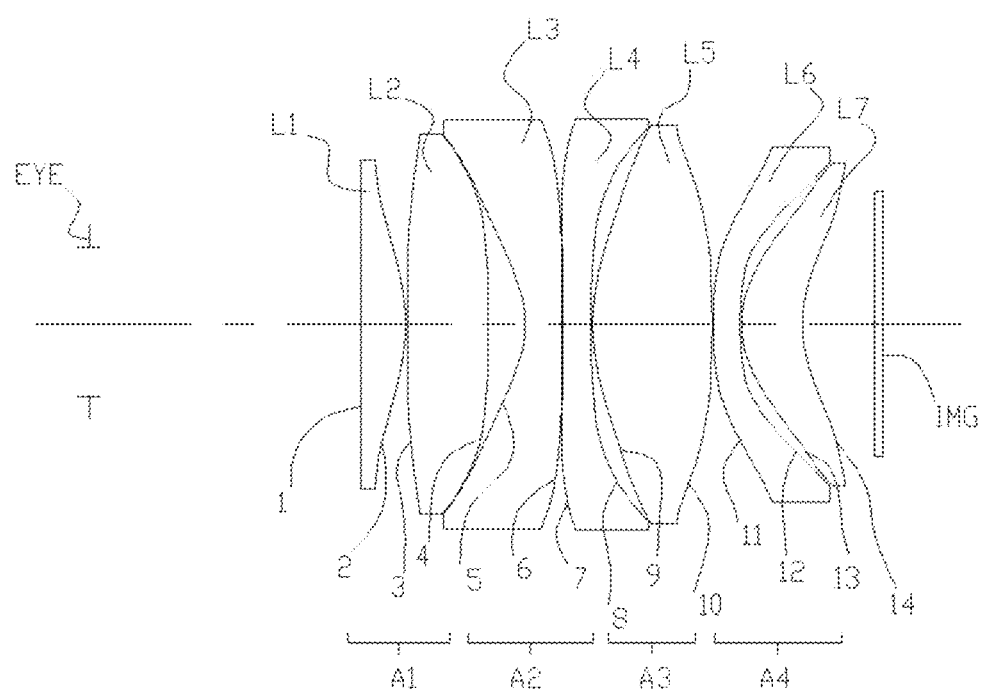
FIG. 1 is a schematic structural diagram of an eyepiece optical system according to Embodiment 1 of the present invention.

In order to make the objectives, technical solutions, and advantages of the embodiments of the present invention clearer, the technical solutions will be clearly and completely described below in connection with the embodiments of the present invention, and apparently the described embodiments are some embodiments rather than all embodiments of the present invention. All other embodiments obtained by those of ordinary skill in the art based on the embodiments of the present invention without creative efforts fall within the protection scope of the present invention.

An eyepiece optical system is constructed in the present invention, including a first lens group, a second lens group, a third lens group, and a fourth lens group arranged coaxially and sequentially in an optical axis direction from an observation side of human eyes to a micro-image display side, wherein an effective focal length of the first lens group is $F_1$, and $F_1$ is a positive value, an effective focal length of the second lens group is $F_2$, and $F_2$ is a negative value, an effective focal length of the third lens group is $F_3$, and $F_3$ is a positive value, an effective focal length of the fourth lens group is $F_4$, and an effective focal length of the eyepiece optical system is F, and $F_1$, $F_2$, $F_3$, $F_4$, and F meet the following relational expressions (1), (2), (3), and (4):

$$0.92 \leq F_1/F \leq 1.20 \quad (1);$$

$$-0.84 \leq F_2/F \leq -0.49 \quad (2),$$

$$1.01 \leq F_3/F \leq 1.44 \quad (3);$$

$$0.90 \leq F_4/F \leq 2.88 \quad (4).$$

The value of $F_1/F$ may be 0.92, 0.922, 0.948, 0.955, 0.9581, 0.991, 1.051, 1.135, 1.20, and the like. The value of $F_2/F$ may be −0.84, −0.835, −0.795, −0.635, −0.612, −0.58, −0.541, −0.518, −0.503, −0.49, and the like. The value of $F_3/F$ may be 1.01, 1.035, 1.095, 1.135, 1.152, 1.258, 1.341, 1.38, 1.403, 1.44, and the like. The value of $F_4/F$ may be 0.90, 1.02, 1.18, 1.295, 1.301, 1.491, 1.61, 2.15, 2.88, and the like.

In the above relational expressions (1), (2), (3), and (4), value ranges for $F_1/F$, $F_2/F$, $F_3/F$, and $F_4/F$ are closely related to the correction of system aberrations, the difficulty of processing optical elements, and the sensitivity to assembly deviations of optical elements. In the relational expression (1), the value of $F_1/F$ is greater than or equal to 0.92, which improves the processability of optical elements in the eyepiece optical system. Its value is less than or equal to 1.20, which allows for sufficient correction of system aberrations, thereby achieving better optical effects. The value of $F_2/F$ in the relational expression (2) is greater than or equal to −0.84, which allows for sufficient correction of system aberrations, thereby achieving desirable optical effects. Its value is less than −0.49, which improves the processability of optical elements in the eyepiece optical system. The value of $F_3/F$ in the relational expression (3) is greater than or equal to 1.01, which improves the processability of optical elements in the eyepiece optical system. Its value is less than or equal to 1.44, which allows for sufficient correction of system aberrations, thereby achieving better quality optical effects. The value of $F_4/F$ in the relational expression (4) is greater than or equal to 0.90, which improves the processability of optical elements in the eyepiece optical system. Its value is less than or equal to 2.88, which allows for sufficient correction of system aberrations, thereby achieving better quality optical effects.

The first lens group is composed of two lenses, namely a first lens close to a human eye side and a second lens away from the human eye side, and both the first lens and the second lens are positive lenses. The second lens group is composed of two lenses, namely a third lens adjacent to the first lens group and a fourth lens away from the human eye side, and both the third lens and the fourth lens are negative lenses. The third lens group is composed of one lens, wherein the third lens group includes a fifth lens adjacent to the second lens group, and the fifth lens is a positive lens. The fourth lens group is composed of two lenses, namely a sixth lens adjacent to the third lens group and a seventh lens away from the human eye side.

Material properties of the various lenses in the eyepiece optical system meet the following relational expressions (5) and (6):

$$1.63 \leq Nd \leq 2.00 \quad (5);$$

$$20.4 \leq Vd \leq 54.90 \quad (6)$$

wherein Nd is a refractive index of each lens in the eyepiece optical system on a d-line, and Vd is an Abbe number of each lens in the eyepiece optical system on the d-line.

In the above embodiment, based on the above features, the first lens, the second lens, the third lens, the fourth lens, the fifth lens, the sixth lens, and the seventh lens with low refractive indexes are used, in combination with various positive and negative lenses, which effectively alleviates the defects of the prior art, and has a better aberration correction ability and better processability, thereby achieving a large field-of-view angle, low distortion, and high optical resolution, reducing the manufacturing difficulty, manufacturing cost, and product weight of the optical system, and greatly improving the user experience of the product. By combining dispersion coefficients of the materials, the chromatic aberration of the optical system is alleviated, thereby enhancing the optical performance of the system.

The value of Nd may be 1.63, 1.682, 1.698, 1.75, 1.781, 1.791, 1.851, 1.87, 2.00, and the like, and the value of Vd may be 20.40, 22.682, 33.698, 34.75, 35.781, 35.791, 41.851, 52.87, 54.90, and the like.

In a further embodiment, the first lens is a plano-convex lens, an optical surface of the first lens close to the human eye side is a plane, and an optical surface of the first lens away from the human eye side is concave towards the human eyes.

In a further embodiment, both the second lens and the fifth lens are biconvex lenses.

The combination of the first lens in a plano-convex shape and the second lens with a surface close to the human eye side concave towards the human eyes effectively reduces the overall size of the eyepiece optical system.

In a further embodiment, the third lens is a biconcave lens, and both optical surfaces of the third lens are concave towards the human eye side.

In a further embodiment, the fourth lens, the sixth lens, and the seventh lens are all meniscus lenses, and both optical surfaces of each of the fourth lens, the sixth lens, and the seventh lens are concave towards the micro-image display side.

Aberrations such as astigmatism and field curvature of the system are further alleviated, which is beneficial for the eyepiece optical system to achieve high-resolution optical effects with full-frame uniform image quality.

In a further embodiment, the effective focal length of the first lens group is $F_1$, the effective focal length of the second lens group is $F_2$, the effective focal length of the third lens group is $F_3$, the effective focal length of the fourth lens group is $F_4$, an effective focal length of the second lens is $f_2$, an effective focal length of the third lens is $f_3$, and an effective focal length of the seventh lens is $f_7$, and $F_1$, $F_2$, $F_3$, $F_4$, $f_2$, $f_3$, and $f_7$ meet the following relational expressions (7), (8), (9), and (10):

$$0.98 \leq F_3/F_1 \leq 1.46 \quad (7);$$

$$16.79 \leq f_2/F_1 \leq 23.83 \quad (8);$$

$$1.07 \leq f_3/F_2 \leq 1.20 \quad (9);$$

$$-3.51 \leq f_7/F_4 \leq 0.95 \quad (10).$$

In the above relational expression (7), the value range for $F_3/F_1$ is closely related to the correction of system aberrations, the difficulty of processing optical elements, and the sensitivity to assembly deviations of optical elements. In the relational expression (7), the value of $F_3/F_1$ is greater than or equal to 0.98, which improves the processability of optical elements in the system. Its value is less than 1.46, which allows for sufficient correction of system aberrations, thereby achieving better optical effects. The value of $f_2/F_1$ in the relational expression (8) is greater than or equal to 16.79, which is used to reduce the difficulty in processing the second lens and the requirement for high refractive index of the material. Its value is less than or equal to 23.83, which is beneficial for the system to achieve image telecentricity. The value of $f_3/F_2$ in the relational expression (9) is greater than or equal to 1.07, which is used to reduce the difficulty in processing the third lens and the requirement for high refractive index of the material. Its value is less than or equal to 1.20, which is beneficial for the system to achieve image telecentricity. The value of $f_7/F_4$ in the relational expression (10) is greater than or equal to −3.51, which is used to ensure that the system has a sufficiently large back focal length, and is beneficial for the eyepiece optical system to achieve a wide range of visibility adjustment. Its value is less than or equal to 0.95, which allows for sufficient correction of system aberrations, thereby achieving desired optical effects and improving the processability of the optical elements in the system.

The value of $F_3/F_1$ may be 0.98, 0.995, 1.005, 1.135, 1.212, 1.28, 1.341, 1.418, 1.453, 1.46, and the like. The value of $f_2/F_1$ may be 16.79, 17.982, 18.998, 19.05, 19.51, 20.91, 21.251, 22.335, 23.83, and the like. The value of $f_3/F_2$ may be 1.07, 1.082, 1.10, 1.13, 1.192, 1.195, 1.20, and the like. The value of $f_7/F_4$ may be −3.51, −3.35, −2.795, −2.635, −1.82, −1.58, −1.541, −1.18, −1.03, −0.95, and the like.

In a further embodiment, the curvature radii of the two optical surfaces of the sixth lens and the curvature radii of the two optical surfaces of the seventh lens meet the following relational expressions (11), (12), and (13):

$$-16.27 \leq R_{42}/R_{41} \leq 2.16 \quad (11);$$

$$0.15 \leq R_{43}/R_{41} \leq 0.36 \quad (12);$$

$$0.12 \leq R_{44}/R_{41} \leq 0.51 \quad (13);$$

wherein $R_{41}$ is a curvature radius of the surface of the sixth lens close to the human eye side, $R_{42}$ is a curvature radius of the surface of the sixth lens close to the micro-image display side, $R_{43}$ is a curvature radius of the surface of the seventh lens close to the human eye side, and $R_{44}$ is a curvature radius of the surface of the seventh lens close to the micro-image display side.

In the above embodiment, a lower limit condition for the value of $R_{42}/R_{41}$ is greater than or equal to −16.27, which allows the sixth lens to provide sufficient negative focal power, thereby better balancing and correcting the system aberrations and achieving good optical effects. Its value is less than 2.16, thereby reducing the difficulty in correcting the spherical aberration and facilitating the realization of a large optical aperture. A lower limit condition for the value of $R_{43}/R_{41}$ is greater than or equal to 0.15, which allows the seventh lens to provide sufficient positive focal power, thereby ensuring that the eyepiece optical system can achieve a sufficiently large field-of-view angle. An upper limit condition for its value is less than or equal to 0.36, thereby reducing the difficulty in correcting the spherical aberration and facilitating the realization of a large optical aperture. A lower limit condition for the value of $R_{44}/R_{41}$ is greater than or equal to 0.12, which allows the seventh lens to provide sufficient positive focal power, thereby ensuring that the eyepiece optical system can achieve a sufficiently large field-of-view angle. An upper limit condition for its value is less than or equal to 0.51, thereby reducing the difficulty in correcting the spherical aberration and facilitating the realization of a large optical aperture.

The value of $R_{42}/R_{41}$ may be −16.27, −14.082, −11.098, −4.15, −1.151, 1.191, 1.251, 2.16, and the like. The value of $R_{43}/R_{41}$ may be 0.15, 0.182, 0.20, 0.213, 0.292, 0.31, 0.36, and the like. The value of $R_{44}/R_{41}$ may be 0.12, 0.122, 0.128, 0.213, 0.392, 0.431, 0.46, 0.51, and the like.

In a further embodiment, the curvature radius of the optical surface of the third lens close to the human eye side is $R_{21}$, the curvature radius of the optical surface of the fourth lens close to an image source side is $R_{24}$, and $R_{21}$ and $R_{24}$ meet the following relational expression (14):

$$-0.15 \leq R_{21}/R_{24} \leq -0.02 \quad (14).$$

The value of $R_{21}/R_{24}$ may be −0.15, −0.121, −0.10, −0.09, −0.065, −0.051, −0.031, −0.02, and the like.

In the above embodiment, an upper limit condition for the value of $R_{21}/R_{24}$ is greater than or equal to −0.15, which allows the third lens to provide sufficient negative focal power, thereby better balancing and correcting the system aberrations and achieving good optical effects. Its value is less than −0.02, thereby reducing the difficulty in correcting the spherical aberration and facilitating the realization of a large optical aperture.

In a further embodiment, an optical material of each lens in the first lens group, the second lens group, the third lens group, and the fourth lens group is a plastic resin material or a glass material.

Therefore, aberrations at all levels of the eyepiece optical system can be sufficiently corrected, and the manufacturing cost of optical elements and the weight of the optical system are also controlled.

In a further embodiment, the optical surface of the first lens away from the human eyes, and the optical surfaces of the second lens, the third lens, the fourth lens, the fifth lens, the sixth lens, and the seventh lens are all even-order aspherical surfaces, and using the even-order aspherical surfaces provides greater mass productivity and uniqueness in manufacturing.

The even-order aspherical surfaces meet the following relational expression (15):

$$z = \frac{cr^2}{1 + \sqrt{1 - (1+k)c^2 r^2}} + \alpha_2 r^2 + \alpha_4 r^4 + \alpha_6 r^6 + \ldots ; \quad (15)$$

wherein z is a vector height of the optical surface, c is a curvature at an aspherical vertex, k is an aspherical coefficient, $\alpha_2, \alpha_4, \alpha_6, \ldots$ are coefficients of various orders, and r is a distance coordinate from a point on a curved surface to an optical axis of the lens system.

The aberrations (including spherical aberration, coma, distortion, field curvature, astigmatism, chromatic aberration, and other higher-order aberrations) of the optical system are sufficiently corrected, which is beneficial for the eyepiece optical system to achieve a large field-of-view angle and large aperture while further improving the image quality of a central field of view and an edge field of view, reducing the difference in the image quality between the central field of view and the edge field of view, and achieving more uniform image quality and low distortion throughout the entire frame.

The principles, solutions, and display results of the above eyepiece optical system will be further elaborated through more specific embodiments.

In the following embodiments, a diaphragm E may be an exit pupil of the eyepiece optical system for imaging, which is a virtual exit aperture. When the pupil of the human eye is at the diaphragm position, the best imaging effect can be observed. A micro-image display I is an image plane of the eyepiece optical system.

Embodiment 1

TABLE 1

| Surface | Curvature radius | Thickness | Glass Refractive index | Abbe number | Net Diameter | Cone Coefficient |
|---|---|---|---|---|---|---|
| Human eye | Infinite | 15.8 | | | 4.6 | 0 |
| 1 | Infinite | 3.407723 | 1.7433 | 49.335808 | 24.3493 | 0 |
| 2 | −14.87849 | 0.12 | | | 24.97814 | −6.146571 |
| 3 | 22076.84 | 6.088057 | 1.7433 | 49.335808 | 28.11174 | −1238.406 |
| 4 | −260.0417 | 2.800673 | | | 28.73798 | 250.3185 |
| 5 | −7.735551 | 2.726589 | 1.642199 | 22.408848 | 28.68318 | −3.498216 |
| 6 | 768.164 | 0.13 | | | 30.94555 | 2222.581 |
| 7 | −114.8729 | 2.1 | 1.639727 | 23.530454 | 31.16833 | −816.3275 |
| 8 | 107.0679 | 0.12 | | | 29.98256 | −303.324 |
| 9 | 17.04604 | 9 | 1.809995 | 41.000073 | 30.10707 | −1.952561 |
| 10 | −106.709 | 0.12 | | | 29.86731 | 35.5017 |
| 11 | 53.23379 | 2 | 1.642199 | 22.408848 | 26.90245 | −100.3201 |
| 12 | 46.53978 | 0.12 | | | 24.37022 | −3.264508 |
| 13 | 8.003615 | 4.562981 | 1.809995 | 41.000073 | 24.42624 | −1.740125 |
| 14 | 10.86173 | 5.874754 | | | 23.76205 | −2.969822 |
| Image plane | Infinite | | | | 21.81494 | 0 |

FIG. 1 is a schematic structural diagram of an optical path of an eyepiece optical system according to Embodiment 1. As shown in the figure, from an observation side of human eyes to a micro-image display I side (from left to right), there are a diaphragm E, a first lens group A1, a second lens group A2, a third lens group A3, a fourth lens group A4, and the micro-image display I in sequence. The first lens group A1 is composed of a first lens L1 and a second lens L2, and both the first lens L1 and the second lens L2 are positive lenses. The second lens group A2 is composed of a third lens L3 and a fourth lens L4, and both the third lens L3 and the fourth lens L4 are negative lenses. The third lens group A3 is composed of a fifth lens L5, and the fifth lens L5 is a positive lens. The fourth lens group A4 is composed of a sixth lens L6 and a seventh lens L7. The first lens L1 is a plano-convex lens, with an optical surface closer to the human eye side being a plane and an optical surface away from the human eye side being concave towards the human eyes. Both the second lens L2 and the fifth lens L5 are biconvex lenses. The third lens L3 is a biconcave lens, and both optical surfaces of the third lens L3 are concave towards the human eye side. The fourth lens L4, the sixth lens L6, and the seventh lens L7 are all meniscus lenses, and both optical surfaces of each of the fourth lens L4, the sixth lens L6, and the seventh lens L7 are concave towards the micro-image display I side. The optical surface of the first lens L1 away from the human eye side, and the optical surfaces of the second lens L2, the third lens L3, the fourth lens L4, the fifth lens L5, the sixth lens L6, and the seventh lens L7 are all even-order aspherical surfaces. The effective focal length F of the eyepiece optical system is 18.43, the effective focal length $F_1$ of the first lens group A1 is 19.05, the effective focal length $F_2$ of the second lens group A2 is −10.14, the effective focal length $F_3$ of the third lens group A3 is 18.69, the effective focal length $F_4$ of the fourth lens group A4 is 23.06, the effective focal length $f_2$ of the second lens L2 is 344.75, the effective focal length $f_3$ of the third lens L3 is −11.83, and the effective focal length $f_7$ of the seventh lens L7 is 21.8. Here, the optical surface close to the diaphragm E side is numbered 1, and so on (from left to right), and the optical surface close to the micro-image display I is numbered 14.

Figure 2:
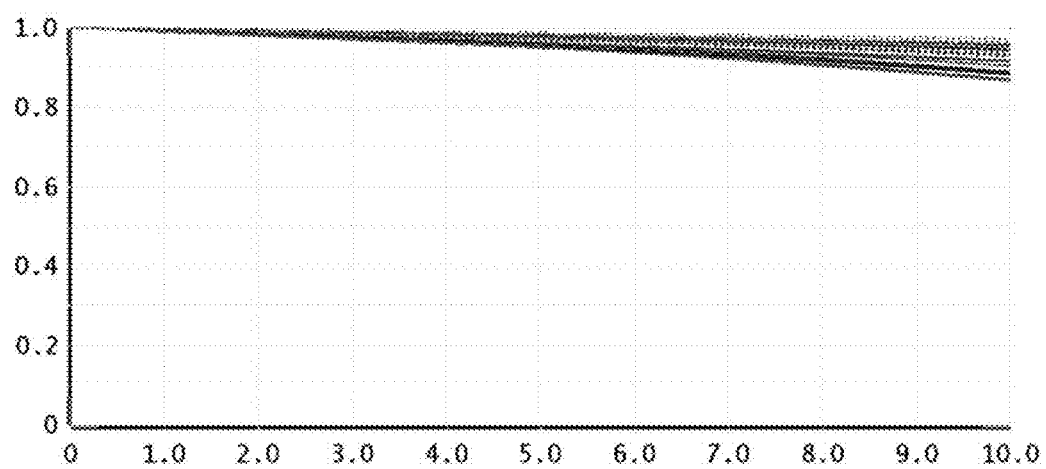
FIG. 2 is a schematic diagram of a modulation transfer function (MTF) of the eyepiece optical system according to Embodiment 1 of the present invention.
Figure 3:
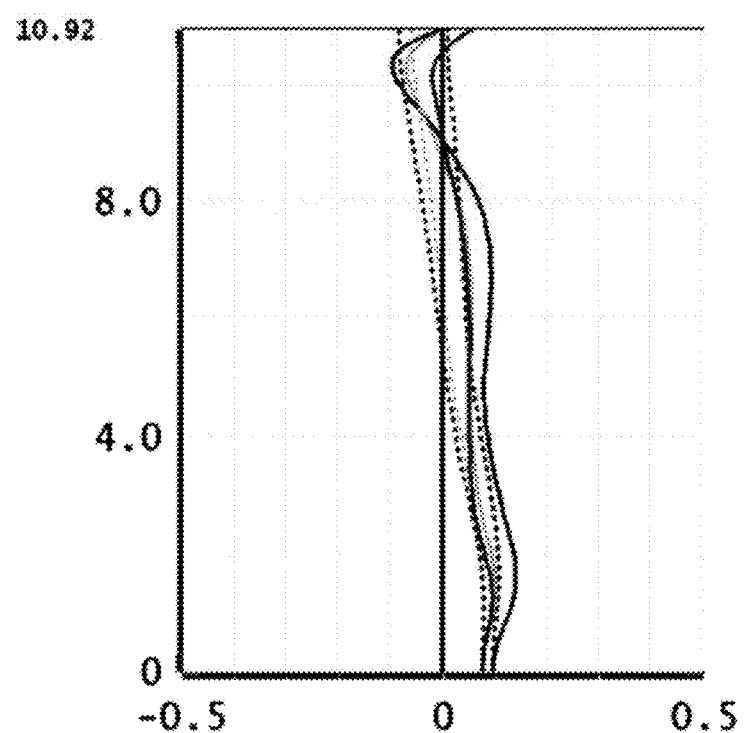
FIG. 3 is a schematic diagram of field curvature of the eyepiece optical system according to Embodiment 1 of the present invention.
Figure 4:
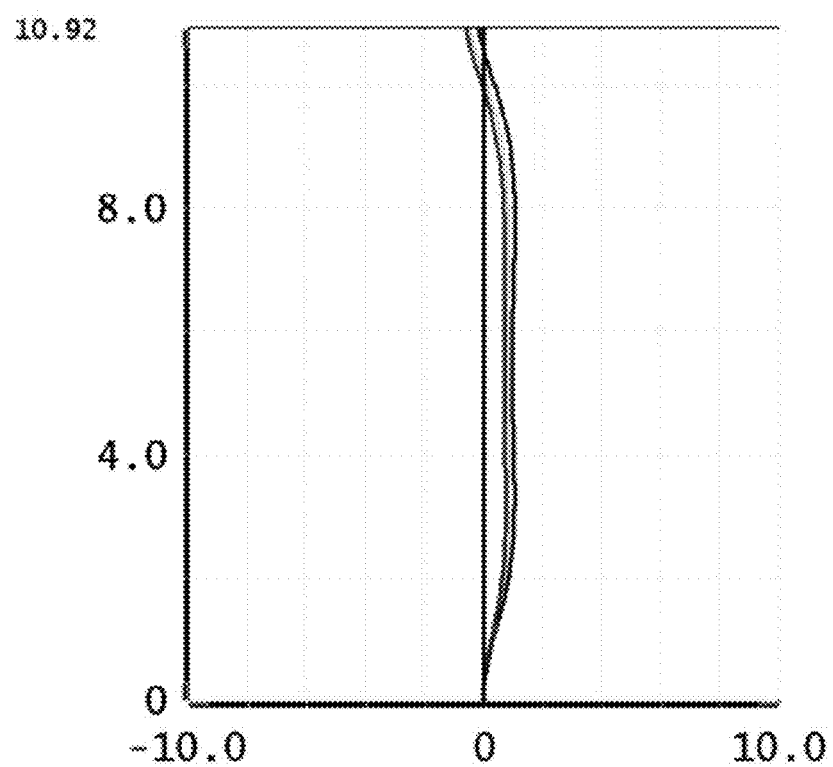
FIG. 4 is a schematic diagram of distortion of the eyepiece optical system according to Embodiment 1 of the present invention.

FIG. 2, FIG. 3, and FIG. 4 respectively show diagrams of the optical transfer function (MTF) curve, field curvature, and distortion of the eyepiece optical system according to Embodiment 1 of the present invention, which reflect that, while ensuring a large field of view, the schematic diagram of the transfer function MTF has a resolution value greater than 0.8 at 101 p. As can be concluded from the above data, the optical system has a high imaging quality with minimal field curvature and optical distortion.

Embodiment 2

TABLE 2

| Surface | Curvature radius | Thickness | Refractive index | Abbe number | Net Diameter | Cone Coefficient |
|---------|------------------|-----------|------------------|-------------|--------------|------------------|
| Human eye | Infinite | 12.8 | | | 4 | 0 |
| 1 | Infinite | 3.885466 | 1.693847 | 53.151009 | 17.47944 | 0 |
| 2 | −16.45194 | 0.6670202 | | | 18.57757 | −6.142025 |
| 3 | −747.332 | 6.341151 | 1.6779 | 54.896588 | 20.16747 | −600 |
| 4 | −225.4723 | 2.89298 | | | 21.34389 | 219.7358 |
| 5 | −13.52536 | 2.439331 | 1.642199 | 22.408848 | 21.17476 | −7.413937 |
| 6 | 548.7992 | 1.523476 | | | 21.81547 | 475.887 |
| 7 | −399.6486 | 2.150289 | 1.639727 | 23.530454 | 22.06293 | −242.9395 |
| 8 | 130.5086 | 0.8724883 | | | 22.10542 | 50.14229 |
| 9 | 26.39314 | 6.178573 | 1.69384 | 53.151009 | 22.9924 | −1.210546 |
| 10 | −96.75791 | 0.5660111 | | | 23.69755 | 48.83982 |
| 11 | 54.70553 | 3.591928 | 1.755502 | 45.594906 | 23.76718 | −86.68603 |
| 12 | −889.8934 | 0.4919027 | | | 23.53624 | 600 |
| 13 | 8.805296 | 4.562981 | 1.6779 | 54.896588 | 23.07827 | −2.765948 |
| 14 | 6.59979 | 5.690173 | | | 22.04817 | −4.414588 |
| Image plane | Infinite | | | | 21.19496 | 0 |

Figure 5:
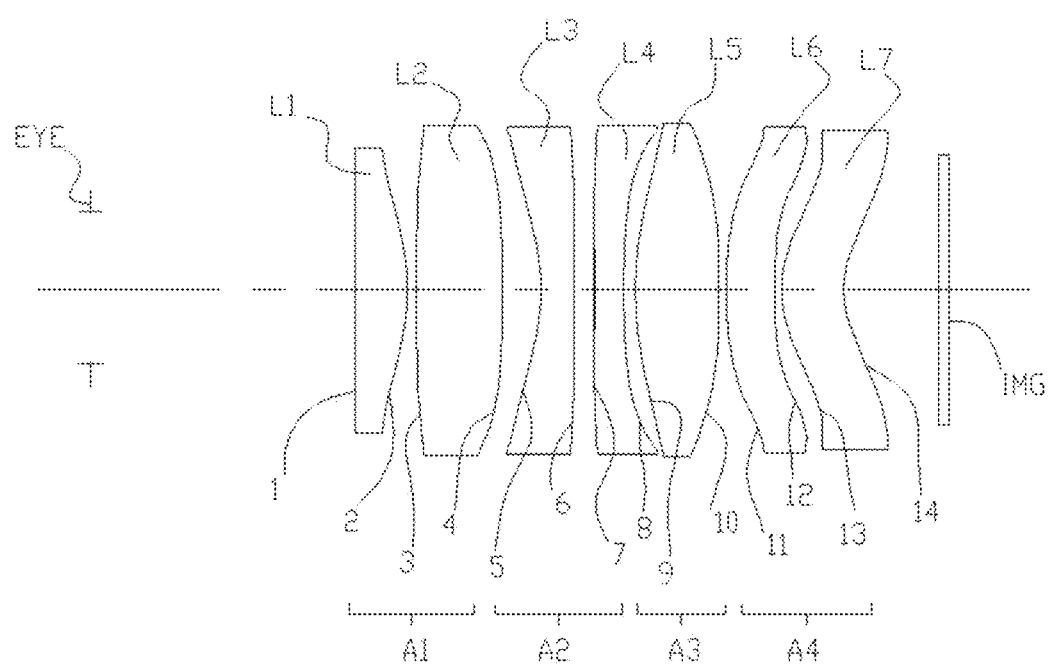
FIG. 5 is a schematic structural diagram of an eyepiece optical system according to Embodiment 2 of the present invention.

FIG. 5 is a schematic structural diagram of an optical path of an eyepiece optical system according to Embodiment 2. As shown in the figure, from an observation side of human eyes to a micro-image display I side (from left to right), there are a diaphragm E, a first lens group A1, a second lens group A2, a third lens group A3, a fourth lens group A4, and the micro-image display I in sequence. The first lens group A1 is composed of a first lens L1 and a second lens L2, and both the first lens L1 and the second lens L2 are positive lenses. The second lens group A2 is composed of a third lens L3 and a fourth lens L4, and both the third lens L3 and the fourth lens L4 are negative lenses. The third lens group A3 is composed of a fifth lens L5, and the fifth lens L5 is a positive lens. The fourth lens group A4 is composed of a sixth lens L6 and a seventh lens L7. The first lens L1 is a plano-convex lens, with an optical surface closer to the human eye side being a plane and an optical surface away from the human eye side being concave towards the human eyes. Both the second lens L2 and the fifth lens L5 are biconvex lenses. The third lens L3 is a biconcave lens, and both optical surfaces of the third lens L3 are concave towards the human eye side. In this embodiment, the effective focal length F of the eyepiece optical system is 23.53, the effective focal length $F_1$ of the first lens group A1 is 22.79, the effective focal length $F_2$ of the second lens group A2 is −17.58, the effective focal length $F_3$ of the third lens group A3 is 30.43, the effective focal length $F_4$ of the fourth lens group A4 is 67.83, the effective focal length $f_2$ of the second lens L2 is 472.66, the effective focal length $f_3$ of the third lens L3 is −20.38, and the effective focal length $f_7$ of the seventh lens L7 is −238.17. Here, the optical surface close to the diaphragm E side is numbered 1, and so on (from left to right), and the optical surface close to the micro-image display I is numbered 14.

Figure 6:
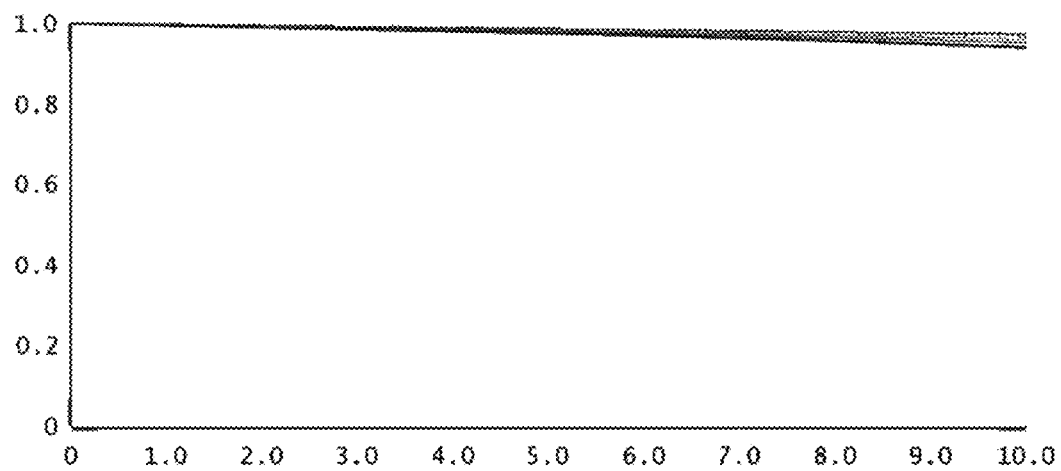
FIG. 6 is a schematic diagram of a modulation transfer function (MTF) of the eyepiece optical system according to Embodiment 2 of the present invention.
Figure 7:
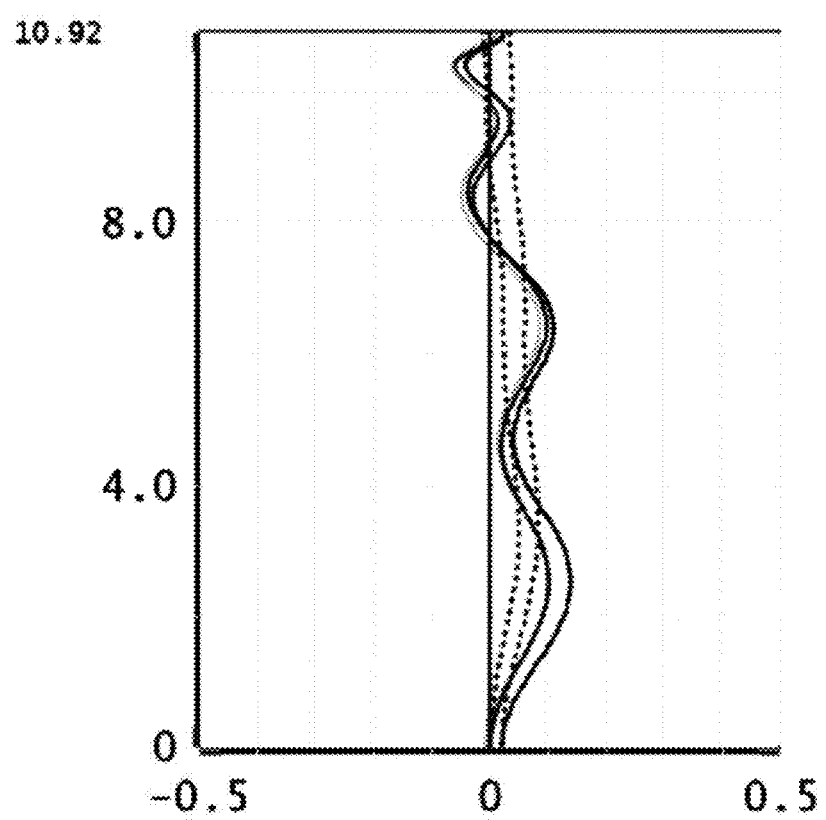
FIG. 7 is a schematic diagram of field curvature of the eyepiece optical system according to Embodiment 2 of the present invention.
Figure 8:
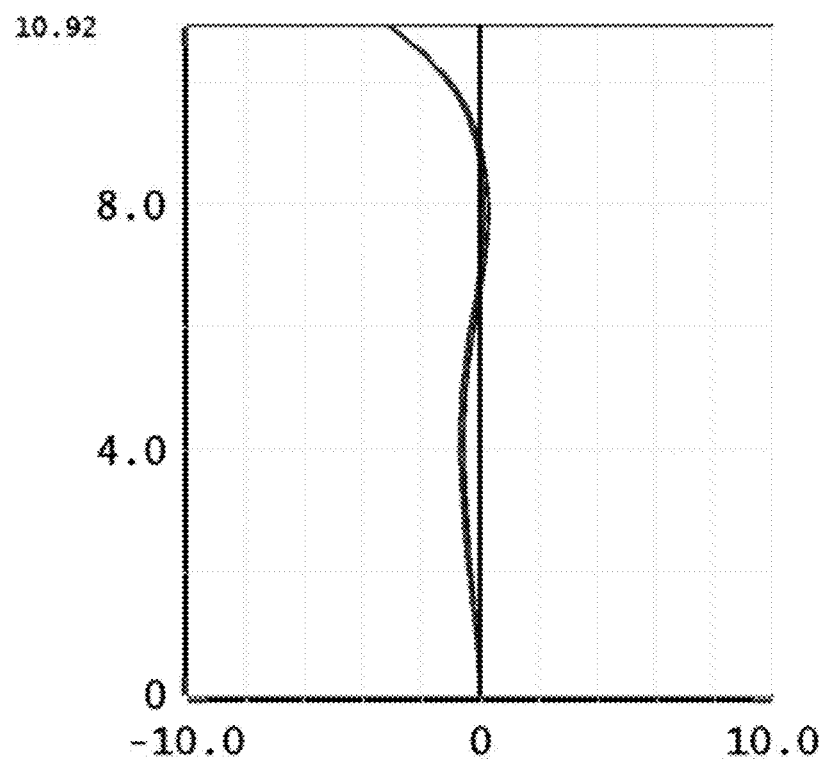
FIG. 8 is a schematic diagram of distortion of the eyepiece optical system according to Embodiment 2 of the present invention.

FIG. 6, FIG. 7, and FIG. 8 respectively show diagrams of the optical transfer function (MTF) curve, field curvature, and distortion of the eyepiece optical system according to Embodiment 2 of the present invention, which reflect that, while ensuring a large field of view, the schematic diagram of the transfer function MTF has a resolution value greater than 0.9 at 101 p. As can be concluded from the above data, the optical system has a high imaging quality with minimal field curvature and optical distortion.

Embodiment 3

TABLE 3

| Surface | Curvature radius | Thickness | Glass | | Net Diameter | Cone Coefficient |
| | | | Refractive index | Abbe number | | |
| --- | --- | --- | --- | --- | --- | --- |
| Human eye | Infinite | 13 | | | 4 | 0 |
| 1 | Infinite | 4.899303 | 1.820795 | 42.655549 | 22.18722 | 0 |
| 2 | −12.37536 | 0.1 | | | 23.45505 | −4.807878 |
| 3 | −1692.465 | 5.481465 | 1.755002 | 52.329298 | 26.56369 | 238.1653 |
| 4 | −227.6345 | 2.728731 | | | 27.02088 | 204.8622 |
| 5 | −6.814918 | 1.87498 | 1.808108 | 22.690566 | 26.67627 | −3.963813 |
| 6 | 3061.788 | 0.4545765 | | | 28.05404 | −530.5521 |
| 7 | −131.2307 | 1.687002 | 1.632785 | 23.308235 | 28.05959 | −210.7031 |
| 8 | 357.9415 | 0.4729375 | | | 27.26585 | 598.411 |
| 9 | 20.37012 | 6.771602 | 1.816001 | 46.56921 | 28.28875 | −1.21986 |
| 10 | −100.9181 | 0.450262 | | | 28.10659 | 37.82796 |
| 11 | 25.46325 | 1.986726 | 1.900696 | 37.053564 | 26.67211 | −54.86337 |
| 12 | 55.00985 | 0.5003313 | | | 26.33169 | −598.3214 |
| 13 | 8.701926 | 6.266303 | 1.772501 | 49.613485 | 26.13238 | −1.405585 |
| 14 | 12.94807 | 2.968033 | | | 26.4932 | −1.416162 |
| Image plane | Infinite | | | | 25.79889 | 0 |

Figure 9:
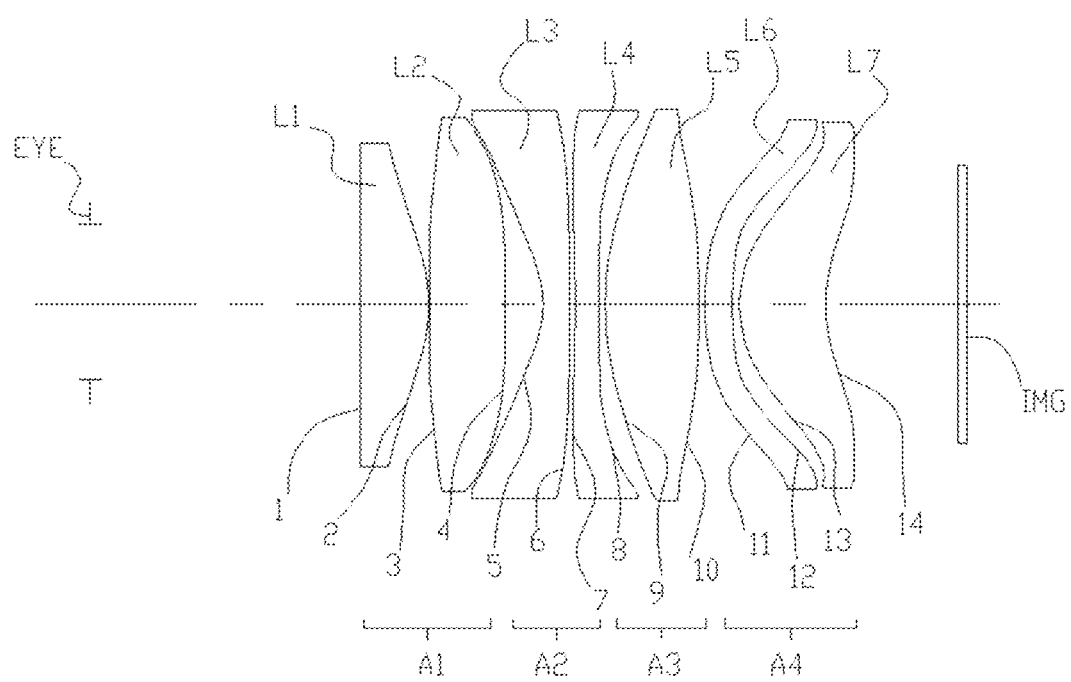
FIG. 9 is a schematic structural diagram of an eyepiece optical system according to Embodiment 3 of the present invention.

FIG. 9 is a schematic structural diagram of an optical path of an eyepiece optical system according to Embodiment 3. As shown in the figure, from an observation side of human eyes to a micro-image display I side (from left to right), there are a diaphragm E, a first lens group A1, a second lens group A2, a third lens group A3, a fourth lens group A4, and the micro-image display I in sequence. The first lens group A1 is composed of a first lens L1 and a second lens L2, and both the first lens L1 and the second lens L2 are positive lenses. The second lens group A2 is composed of a third lens L3 and a fourth lens L4, and both the third lens L3 and the fourth lens L4 are negative lenses. The third lens group A3 is composed of a fifth lens L5, and the fifth lens L5 is a positive lens. The fourth lens group A4 is composed of a sixth lens L6 and a seventh lens L7. The first lens L1 is a plano-convex lens, with an optical surface closer to the human eye side being a plane and an optical surface away from the human eye side being concave towards the human eyes. Both the second lens L2 and the fifth lens L5 are biconvex lenses. The third lens L3 is a biconcave lens, and both optical surfaces of the third lens L3 are concave towards the human eye side. In this embodiment, the effective focal length F of the eyepiece optical system is 15.88, the effective focal length $F_1$ of the first lens group A1 is 14.55, the effective focal length $F_2$ of the second lens group A2 is −7.83, the effective focal length $F_3$ of the third lens group A3 is 21.24, the effective focal length $F_4$ of the fourth lens group A4 is 14.37, the effective focal length $f_2$ of the second lens L2 is 346.78, the effective focal length $f_3$ of the third lens L3 is −8.36, and the effective focal length $f_7$ of the seventh lens L7 is 20.83. Here, the optical surface close to the diaphragm E side is numbered 1, and so on (from left to right), and the optical surface close to the micro-image display I is numbered 14.

Figure 10:
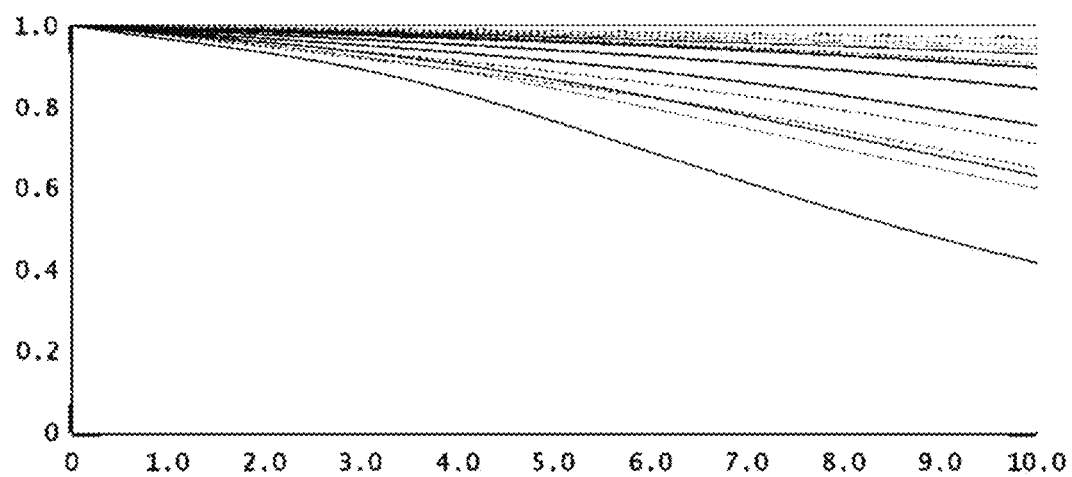
FIG. 10 is a schematic diagram of a modulation transfer function (MTF) of the eyepiece optical system according to Embodiment 3 of the present invention.
Figure 11:
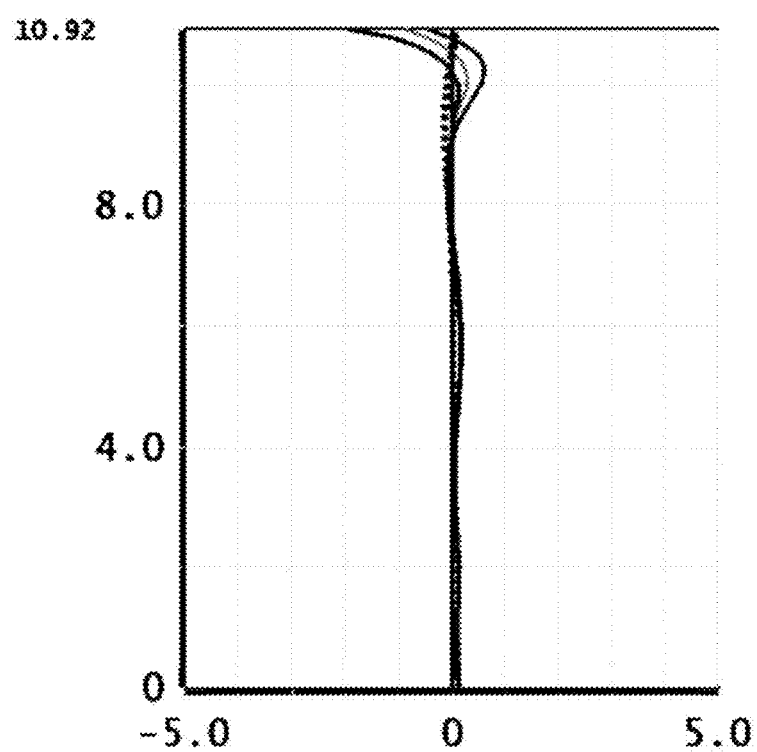
FIG. 11 is a schematic diagram of field curvature of the eyepiece optical system according to Embodiment 3 of the present invention.
Figure 12:
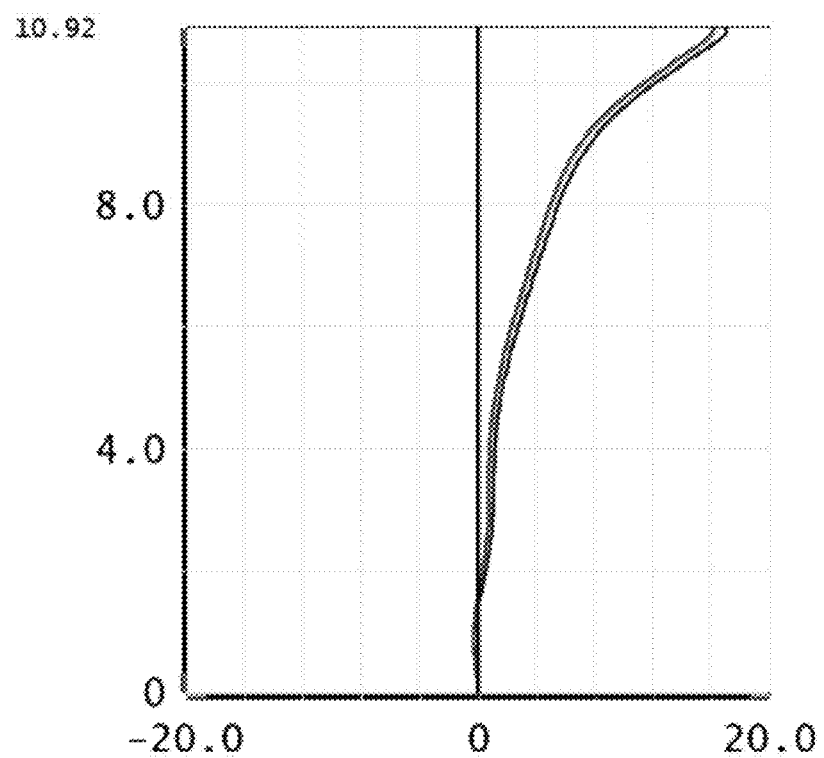
FIG. 12 is a schematic diagram of distortion of the eyepiece optical system according to Embodiment 3 of the present invention.

FIG. 10, FIG. 11, and FIG. 12 respectively show diagrams of the optical transfer function (MTF) curve, field curvature, and distortion of the eyepiece optical system according to Embodiment 3 of the present invention, which reflect that, while ensuring a large field of view, the schematic diagram of the transfer function MTF has a resolution value greater than 0.9 at 101 p. As can be concluded from the above data, the optical system has a high imaging quality with minimal field curvature and optical distortion.

Embodiment 4

TABLE 4

| Surface | Curvature radius | Thickness | Glass | | Net Diameter | Cone Coefficient |
| | | | Refractive index | Abbe number | | |
| --- | --- | --- | --- | --- | --- | --- |
| Human eye | Infinite | 12 | | | 4 | 0 |
| 1 | Infinite | 3.519229 | 1.816001 | 46.56921 | 20.86507 | 0 |
| 2 | −14.87849 | −0.04351009 | | | 21.79205 | −6.146571 |
| 3 | −13359.92 | 5.091264 | 1.772501 | 49.613485 | 24.39359 | 599.5886 |
| 4 | −220.8773 | 1.904114 | | | 25.49946 | 234.969 |
| 5 | −9.924054 | 1.979959 | 1.66059 | 20.401227 | 25.33186 | −4.917852 |
| 6 | 380.5623 | 0.5033695 | | | 26.97153 | 599.5992 |

TABLE 4-continued

| Surface | Curvature radius | Thickness | Glass Refractive index | Abbe number | Net Diameter | Cone Coefficient |
|---|---|---|---|---|---|---|
| 7 | −256.5127 | 1.873974 | 1.632801 | 23.329851 | 27.36197 | −251.0632 |
| 8 | 67.84433 | 0.4999981 | | | 27.23715 | −115.0723 |
| 9 | 17.19303 | 8.190154 | 1.729164 | 54.669031 | 28.18592 | −1.590163 |
| 10 | −102.932 | 0.4875132 | | | 28.31307 | 34.19842 |
| 11 | 25.32451 | 2.051925 | 2.001703 | 20.705366 | 26.45125 | −22.22202 |
| 12 | 25.23753 | 0.473796 | | | 26.68758 | −3.16313 |
| 13 | 9.059042 | 6.5858 | 1.883 | 40.806875 | 26.60675 | −1.299423 |
| 14 | 12.60061 | 2.57945 | | | 27.25866 | −2.95842 |
| Image plane | Infinite | | | | 26.46888 | 0 |

Figure 13:
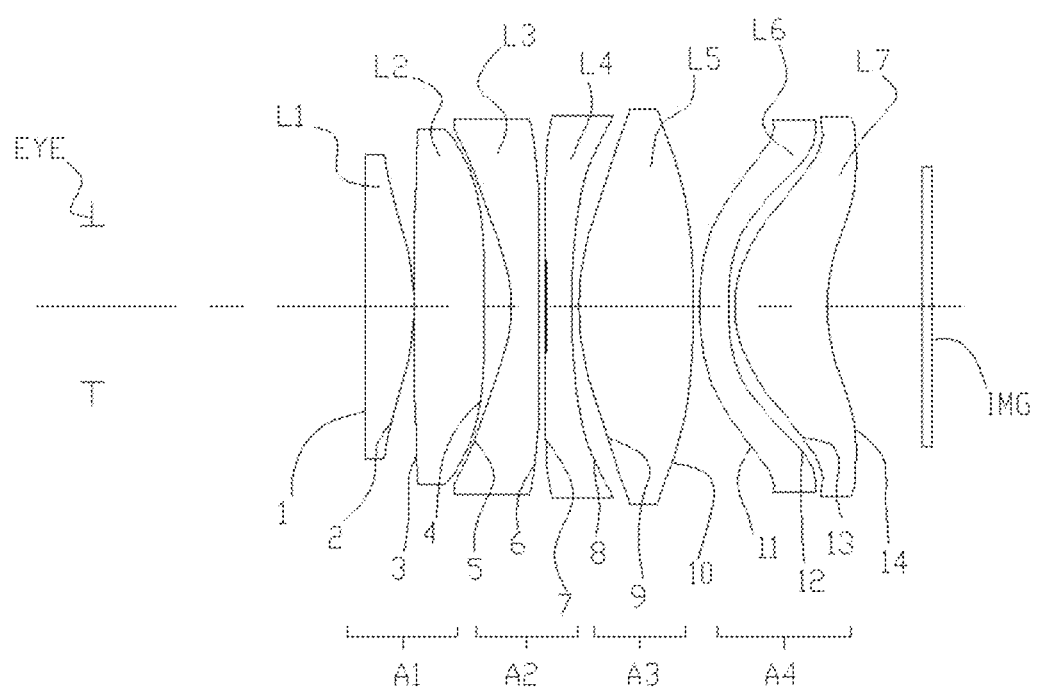
FIG. 13 is a schematic structural diagram of an eyepiece optical system according to Embodiment 4 of the present invention.

FIG. 13 is a schematic structural diagram of an optical path of an eyepiece optical system according to Embodiment 4. As shown in the figure, from an observation side of human eyes to a micro-image display I side (from left to right), there are a diaphragm E, a first lens group A1, a second lens group A2, a third lens group A3, a fourth lens group A4, and the micro-image display I in sequence. The first lens group A1 is composed of a first lens L1 and a second lens L2, and both the first lens L1 and the second lens L2 are positive lenses. The second lens group A2 is composed of a third lens L3 and a fourth lens L4, and both the third lens L3 and the fourth lens L4 are negative lenses. The third lens group A3 is composed of a fifth lens L5, and the fifth lens L5 is a positive lens. The fourth lens group A4 is composed of a sixth lens L6 and a seventh lens L7. The first lens L1 is a plano-convex lens, with an optical surface closer to the human eye side being a plane and an optical surface away from the human eye side being concave towards the human eyes. Both the second lens L2 and the fifth lens L5 are biconvex lenses. The third lens L3 is a biconcave lens, and both optical surfaces of the third lens L3 are concave towards the human eye side. In this embodiment, the effective focal length F of the eyepiece optical system is 14.42, the effective focal length $F_1$ of the first lens group A1 is 17.26, the effective focal length $F_2$ of the second lens group A2 is −12.06, the effective focal length $F_3$ of the third lens group A3 is 20.75, the effective focal length $F_4$ of the fourth lens group A4 is 19.51, the effective focal length $f_2$ of the second lens L2 is 289.79, the effective focal length $f_3$ of the third lens L3 is −14.5, and the effective focal length $f_7$ of the seventh lens L7 is 19.41. Here, the optical surface close to the diaphragm E side is numbered 1, and so on (from left to right), and the optical surface close to the micro-image display I is numbered 14.

Figure 14:
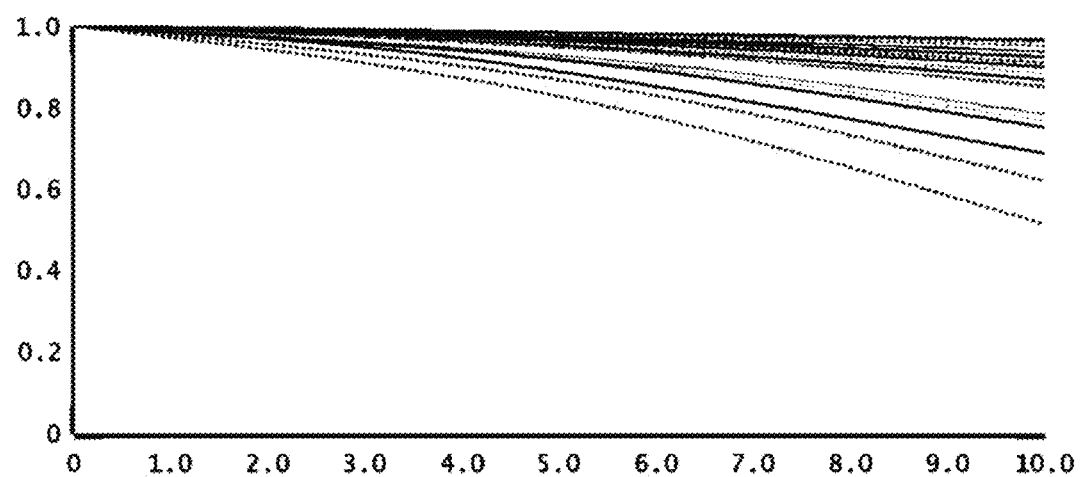
FIG. 14 is a schematic diagram of a modulation transfer function (MTF) of the eyepiece optical system according to Embodiment 4 of the present invention.
Figure 15:
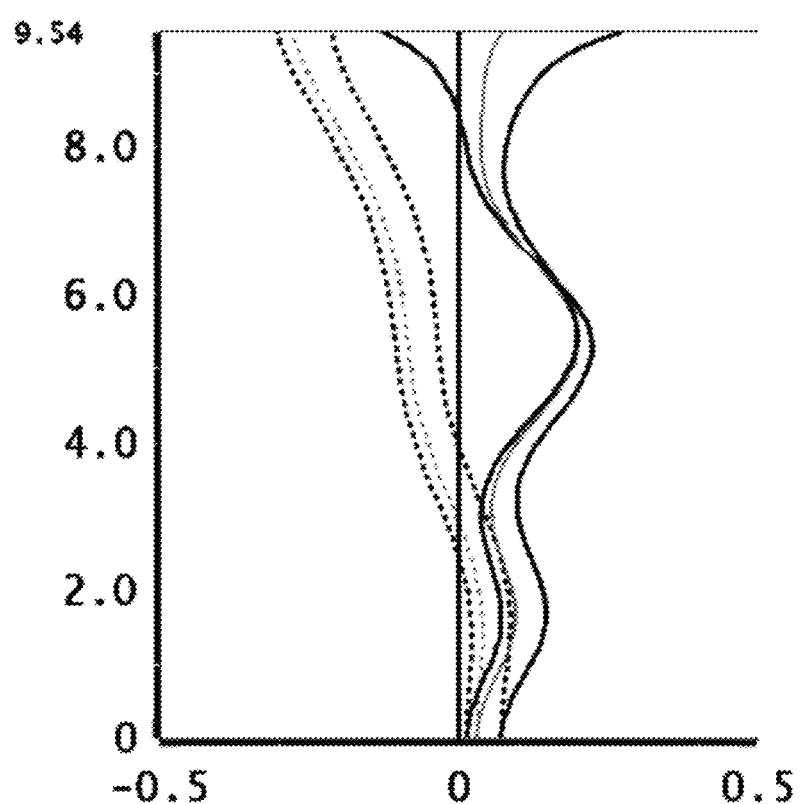
FIG. 15 is a schematic diagram of field curvature of the eyepiece optical system according to Embodiment 4 of the present invention.
Figure 16:
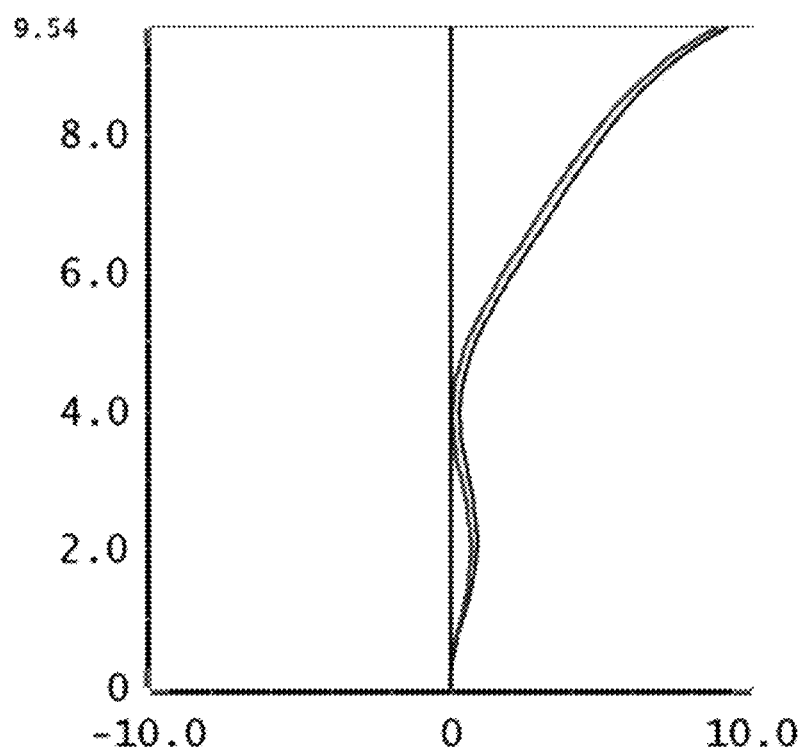
FIG. 16 is a schematic diagram of distortion of the eyepiece optical system according to Embodiment 4 of the present invention.

FIG. 14, FIG. 15, and FIG. 16 respectively show diagrams of the optical transfer function (MTF) curve, field curvature, and distortion of the eyepiece optical system according to Embodiment 4 of the present invention, which reflect that, while ensuring a large field of view, the schematic diagram of the transfer function MTF has a resolution value greater than 0.9 at 101 p. As can be concluded from the above data, the optical system has a high imaging quality with minimal field curvature and optical distortion.

The data of the above Embodiment 1 to Embodiment 4 all meet the parameter requirements recorded in the summary present invention, and the results are shown in Table 5 and Table 6 as follows:

TABLE 5

| | $F_1/F$ | $F_2/F$ | $F_3/F$ | $F_4/F$ | $F_3/F_1$ | $f_2/F_1$ | $f_3/F_2$ | $f_7/F_4$ |
|---|---|---|---|---|---|---|---|---|
| Embodiment 1 | 1.03 | −0.55 | 1.01 | 1.25 | 0.98 | 18.10 | 1.17 | 0.95 |
| Embodiment 2 | 0.97 | −0.75 | 1.29 | 2.88 | 1.34 | 20.74 | 1.16 | −3.51 |
| Embodiment 3 | 0.92 | −0.49 | 1.34 | 0.90 | 1.46 | 23.83 | 1.07 | 1.45 |
| Embodiment 4 | 1.20 | −0.84 | 1.44 | 1.35 | 1.20 | 16.79 | 1.20 | 0.99 |

TABLE 6

| | $R_{21}/R_{24}$ | $R_{42}/R_{41}$ | $R_{43}/R_{41}$ | $R_{44}/R_{41}$ |
|---|---|---|---|---|
| Embodiment 1 | −0.07 | 0.87 | 0.15 | 0.20 |
| Embodiment 2 | −0.10 | −16.27 | 0.16 | 0.12 |
| Embodiment 3 | −0.02 | 2.16 | 0.34 | 0.51 |
| Embodiment 4 | −0.15 | 1.00 | 0.36 | 0.50 |

The present invention further provides a head-mounted display device, including a micro-image display and an eyepiece, the eyepiece being located between human eyes and the micro-image display, wherein the eyepiece is the eyepiece optical system according to any one of the foregoing items.

Further, the micro-image display is an organic electroluminescent device or a transmissive liquid crystal display.

Further, the head-mounted display device includes two identical eyepiece optical systems arranged symmetrically.

In the specific implementation and application process, the display content on the micro-image display is viewed by the observer's left and right eyes respectively through the eyepiece optical system, forming a clear and magnified visual experience. The observer can view large-format images having full-frame high-definition, no distortion, and uniform image quality through the head-mounted display device, thereby achieving the visual experience with a high sense of presence.

In this embodiment, the eyepiece optical system of the head-mounted display device has advantages such as a compact structure, small size, large field-of-view angle, and high optical resolution. The eyepiece optical system adopts a first lens group, a second lens group, and a third lens group in a "positive, negative, positive" combination, in combination with a first lens, a second lens, a third lens, a fourth lens, a fifth lens, a sixth lens, and a seventh lens having low refractive indexes, which effectively alleviates the defects of the prior art, and has a better aberration correction ability and better processability, thereby achieving a large field-of-view angle, low distortion, and high optical resolution, reducing the manufacturing difficulty, manufacturing cost, and product weight of the eyepiece optical system, and greatly improving the optical performance of the system and the user experience of the product.

It should be understood that, for a person of ordinary skill in the art, improvements or changes may be made according to the above descriptions, and all these improvements and changes shall fall within the protection scope of the claims in the present invention.

What is claimed is:

1. An eyepiece optical system, comprising a first lens group, a second lens group, a third lens group, and a fourth lens group arranged coaxially and sequentially in an optical axis direction from an observation side of human eyes to a micro-image display side, wherein an effective focal length of the first lens group is $F_1$, and $F_1$ is a positive value, an effective focal length of the second lens group is $F_2$, and $F_2$ is a negative value, an effective focal length of the third lens group is $F_3$, and $F_3$ is a positive value, an effective focal length of the fourth lens group is $F_4$, and an effective focal length of the eyepiece optical system is F, and $F_1$, $F_2$, $F_3$, $F_4$, and F meet the following relational expressions (1), (2), (3), and (4):

$$0.92 \leq F_1/F \leq 1.20 \qquad (1);$$

$$-0.84 \leq F_2/F \leq -0.49 \qquad (2);$$

$$1.01 \leq F_3/F \leq 1.44 \qquad (3);$$

$$0.90 \leq F_4/F \leq 2.88 \qquad (4);$$

the first lens group is composed of two lenses, namely a first lens close to a human eye side and a second lens away from the human eye side, and both the first lens and the second lens are positive lenses; the second lens group is composed of two lenses, namely a third lens adjacent to the first lens group and a fourth lens away from the human eye side, and both the third lens and the fourth lens are negative lenses; the third lens group is composed of one lens, wherein the third lens group comprises a fifth lens adjacent to the second lens group, and the fifth lens is a positive lens; and the fourth lens group is composed of two lenses, namely a sixth lens adjacent to the third lens group and a seventh lens away from the human eye side;

material properties of the various lenses in the eyepiece optical system meet the following relational expressions (5) and (6):

$$1.63 \leq Nd \leq 2.00 \qquad (5);$$

$$20.4 \leq Vd \leq 54.90 \qquad (6)$$

wherein Nd is a refractive index of each lens in the eyepiece optical system on a d-line, and Vd is an Abbe number of each lens in the eyepiece optical system on the d-line.

2. The eyepiece optical system according to claim 1, wherein the first lens is a plano-convex lens, an optical surface of the first lens close to the human eye side is a plane, and an optical surface of the first lens away from the human eye side is concave towards the human eyes.

3. The eyepiece optical system according to claim 1, wherein both the second lens and the fifth lens are biconvex lenses.

4. The eyepiece optical system according to claim 1, wherein the third lens is a biconcave lens, and both optical surfaces of the third lens are concave towards the human eye side.

5. The eyepiece optical system according to claim 1, wherein the fourth lens, the sixth lens, and the seventh lens are all meniscus lenses, and both optical surfaces of each of the fourth lens, the sixth lens, and the seventh lens are concave towards the micro-image display side.

6. The eyepiece optical system according to claim 1, wherein the effective focal length of the first lens group is $F_1$, the effective focal length of the second lens group is $F_2$, the effective focal length of the third lens group is $F_3$, the effective focal length of the fourth lens group is $F_4$, an effective focal length of the second lens is $f_2$, an effective focal length of the third lens is $f_3$, and an effective focal length of the seventh lens is $f_7$, and $F_1$, $F_2$, $F_3$, $F_4$, $f_2$, $f_3$, and $f_7$ meet the following relational expressions (7), (8), (9), and (10):

$$0.98 \leq F_3/F_1 \leq 1.46 \qquad (7);$$

$$16.79 \leq f_2/F_1 \leq 23.83 \qquad (8);$$

$$1.07 \leq f_3/F_2 \leq 1.20 \qquad (9);$$

$$-3.51 \leq f_7/F_4 \leq 0.95 \qquad (10).$$

7. The eyepiece optical system according to claim 1, wherein the curvature radii of the two optical surfaces of the sixth lens and the curvature radii of the two optical surfaces of the seventh lens meet the following relational expressions (11), (12), and (13):

$$-16.27 \leq R_{42}/R_{41} \leq 2.16 \qquad (11);$$

$$0.15 \leq R_{43}/R_{41} \leq 0.36 \qquad (12);$$

$$0.12 \leq R_{44}/R_{41} \leq 0.51 \qquad (13);$$

wherein $R_{41}$ is a curvature radius of the surface of the sixth lens close to the human eye side, $R_{42}$ is a curvature radius of the surface of the sixth lens close to the micro-image display side, $R_{43}$ is a curvature radius of the surface of the seventh lens close to the human eye side, and $R_{44}$ is a curvature radius of the surface of the seventh lens close to the micro-image display side.

8. The eyepiece optical system according to claim 1, wherein the curvature radius of the optical surface of the third lens close to the human eye side is $R_{21}$, the curvature radius of the optical surface of the fourth lens close to an image source side is $R_{24}$, and $R_{21}$ and $R_{24}$ meet the following relational expression (14):

$$-0.15 \leq R_{21}/R_{24} \leq -0.02 \qquad (14).$$

9. The eyepiece optical system according to claim 1, wherein each lens in the first lens group, the second lens group, the third lens group, and the fourth lens group is made of a plastic resin material or a glass material.

10. The eyepiece optical system according to claim 1, wherein the optical surface of the first lens away from the human eyes, and the optical surfaces of the second lens, the third lens, the fourth lens, the fifth lens, the sixth lens, and the seventh lens are all even-order aspherical surfaces, and the even-order aspherical surfaces meet the following relational expression (15):

$$z = \frac{cr^2}{1 + \sqrt{1 - (1+k)c^2 r^2}} + \alpha_2 r^2 + \alpha_4 r^4 + \alpha_6 r^6 + \ldots ; \qquad (15)$$

wherein z is a vector height of the optical surface, c is a curvature at an aspherical vertex, k is an aspherical coefficient, $\alpha_2$, $\alpha_4$, $\alpha_6$, . . . are coefficients of various orders, and r is a distance coordinate from a point on a curved surface to an optical axis of the lens system.

11. A head-mounted display device, comprising a micro-image display and an eyepiece, the eyepiece being located between human eyes and the micro-image display, wherein the eyepiece is the eyepiece optical system according to claim 1.

12. The head-mounted display device according to claim 11, wherein the micro-image display is an organic electroluminescent device or a transmissive liquid crystal display.

13. The head-mounted display device according to claim 11, wherein the head-mounted display device comprises two identical eyepiece optical systems arranged symmetrically.

\* \* \* \* \*